A. N. PIERMAN.
WARNING SIGNAL.
APPLICATION FILED DEC. 2, 1912.
1,135,048.
Patented Apr. 13, 1915.
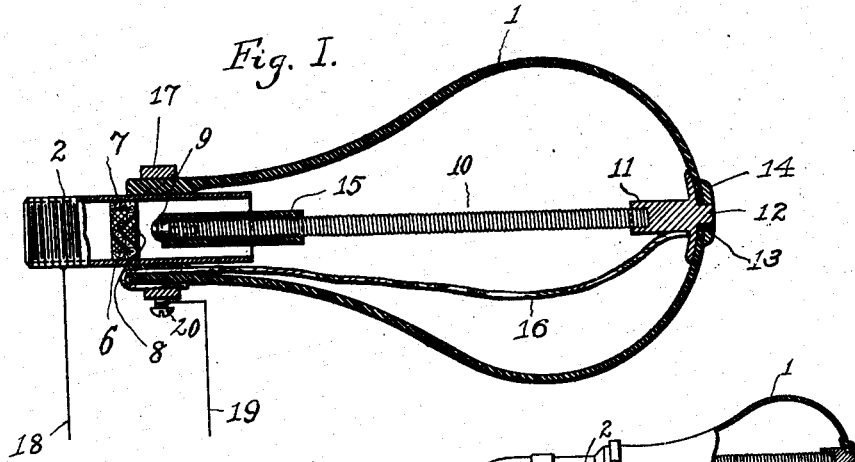
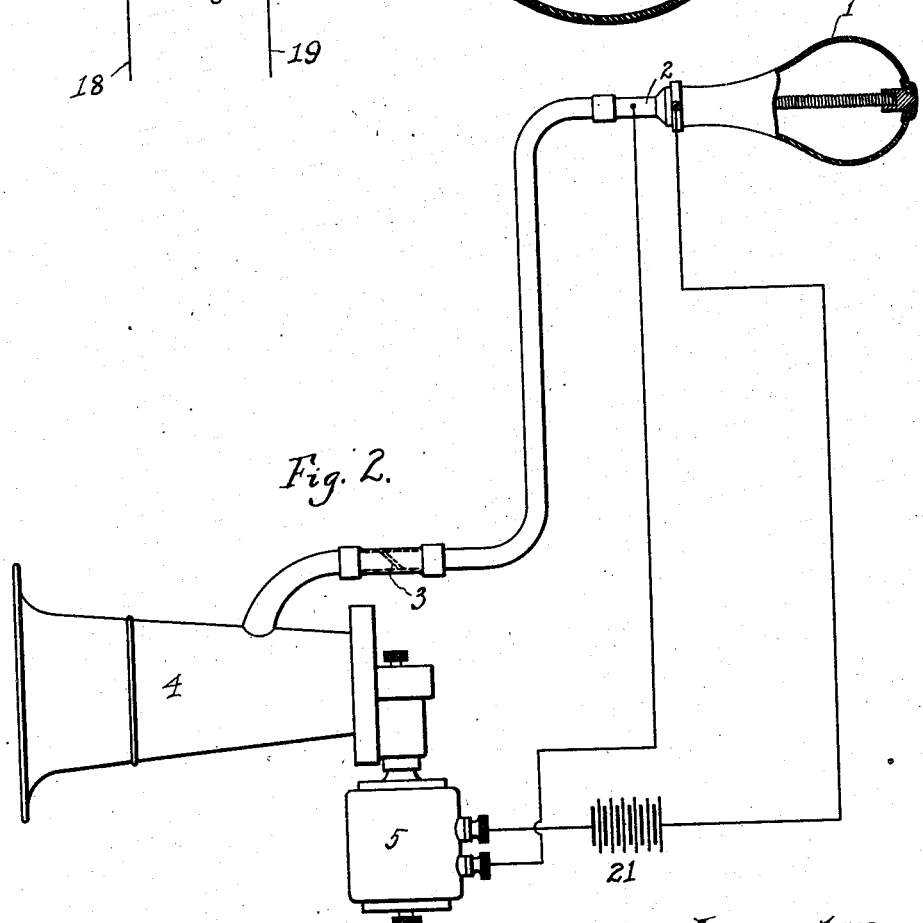
Witnesses:
C. R. Brown.
Inventor:
Alexander N. Pierman
by H. H. Dyke
his Atty.

UNITED STATES PATENT OFFICE.

ALEXANDER N. PIERMAN, OF NEWARK, NEW JERSEY.

WARNING-SIGNAL.

1,135,048.

Specification of Letters Patent. Patented Apr. 13, 1915.

Application filed December 2, 1912. Serial No. 734,472.

*To all whom it may concern:*

Be it known that I, ALEXANDER N. PIERMAN, a citizen of the United States, and a resident of Newark, in the county of Essex and State of New Jersey, have invented a certain new and useful Improvement in Warning-Signals, of which the following is a specification.

My invention relates to signaling devices for warning by means of sound, and may be used for any purpose for which such signaling devices can be utilized, but is particularly adapted for use on motor vehicles, such as pleasure cars, motor trucks, and the like. Heretofore there have been two principal types of devices made use of for this purpose, namely, the reed horn which is operated by pressing a rubber bulb or similar device, and the electrically operated signaling device, which comprises a diaphragm and a megaphone connected therewith and some means operated by the passing of an electrical current for setting the diaphragm into vibration, thus producing the sound for giving the desired warning.

The fields of service covered by each of the signaling means above referred to and now in general use are to a large extent distinct from one another, the usefulness of the reed or bulb horn being limited practically to city traffic, and under conditions where the distance to which the warning signal is to be conveyed is not considerable, and where the speed of the motor vehicle is relatively slow; and the electrically operated signaling device covering the field of use which corresponds to a more rapid operation of the vehicle, and being especially adapted for use in the open country where it may be desired to convey the sound for a considerable distance ahead and sometimes around a bend in the road. These conditions are well understood and it is therefore quite a usual thing to find a single motor vehicle equipped with both of these signaling devices. Nevertheless, although the fields of use of the two types of signaling devices referred to are largely distinct, there exists a zone in which they may be said to overlap and in which there is frequent necessity for a substantially instantaneous shift from one to the other; as, for instance, the operator of the vehicle may make use of the reed horn for sounding a warning to a person who has plenty of time to observe the signal and avoid collision with the vehicle, and who is also within easy hearing distance of the signal, but if, for any reason, as inattention or because of the signal being drowned by extraneous noises, the signal given by the reed horn is not observed, the occasion arises for the immediate and practically instantaneous use of the louder signal furnished by the electric horn, and inasmuch as in the arrangement heretofore made use of, the actuating means of the two horns, namely, the bulb of the reed horn and the switch or push button of the electrical horn, are separately arranged and situated perhaps at some distance from one another, there is opportunity and frequently likelihood of the necessary second and louder signal not being produced in time to prevent collision, or at least of it becoming necessary for the driver of the motor vehicle to slow down or stop the machine, when, if the signal could be readily and quickly produced as desired, no such occasion would arise. In the open country too, there is also frequent occasion for the immediate use of the electrically operated signaling device, in conjunction with the reed horn. Drivers of wagons and other slow moving vehicles are likely to pay no attention to the reed horn, notwithstanding it is perfectly audible to them, whereas if the electrical horn is used the driver will move out of the way, in a more or less involuntary fashion, being compelled, as it were, by the insistent warning of the electrical horn, to make way for the faster vehicle. It will be seen, therefore, that an arrangement which makes it possible for the warning signaling device of comparatively smaller volume, such as a reed horn, to be immediately supplemented at need with certainty by a loud and insistent warning, such as may be furnished, for example, by the electrically operated signaling device, is extremely useful in a variety of instances, and it is to fill this need that the invention of this application has been produced. This result can most effectively be secured by making use of a single means for operating at will either the signal of least loudness or the louder and harsher signal. When the bulb horn and an electrical signaling instrument are used, the switch for the latter may be placed within the bulb of the former, where it is protected, is out of the way and out of sight. A fixed switch member may conveniently be used which may be attached to the immovable stem of the horn bulb and the movable switch member may be attached to the material of the horn bulb and movable therewith. When the movable switch member is attached to the side walls of the horn bulb at any point, it partakes of the movement thereof at all times when the bulb is compressed. In order to cause the expulsion of a current of air with sufficient force to sound an adequate signal by means of a reed horn, it is necessary that the horn bulb be grasped about its greatest diameter and compression applied in such neighborhood, thereby causing the expulsion of the greatest amount of air possible. For this reason it may sometimes happen, when the movable switch member is carried by the side wall of the bulb, that the electrical signaling instrument will be operated by reason of the switch being closed when it is intended by the operator merely to produce warning blasts from the reed horn. The attachment of the lead wire or other electrical connection when the movable switch member is carried by the side walls of the horn bulb also presents some difficulty and the wire projecting from the side of the bulb is likely to be in the way.

It is practically impossible to create a sufficient current of air to operate a reed horn by applying force at the end opposite the stem, as unless the end of the bulb is brought very closely indeed to the stem, the amount of air expelled by such action will be comparatively slight. In my improved structure, therefore, I have attached the movable switch member to the horn bulb at the end thereof opposite or substantially opposite the fixed stem, and I have secured the fixed switch member to the stem in such relation that in order to close the switch it is necessary that pressure be applied at the end of the bulb opposite the stem. As in operation it frequently happens that the bulb is twisted somewhat or pushed somewhat to one side from its normal position, I have provided a flexible connection between the movable switch member and the point of its attachment to the horn bulb, and in order to prevent the passage of current by contact of such flexible member with the side walls of the bulb stem, I provide insulating means which will obstruct the passage of current even though the flexible supporting member is brought into contact with the side walls of the stem as for instance, by bending or twisting the horn bulb. I also carry the lead wire for the movable switch member in through or at the neck of the horn bulb so that such wire does not appear externally on the horn bulb at any point thereof.

Inasmuch as a horn or megaphone is necessary to be provided for the electrically operated horn, there is no necessity for providing a separate similar device for the reed instrument but the tube containing the reed may be led directly into the megaphone for the electrically operated horn, thus considerably simplifying the device. This, however, while the preferred arrangement, is not essential, as it will be readily understood that while a single megaphone may be used for this purpose, in many instances it will be convenient to arrange the electrically operated signaling device and the reed horn operating device at a distance from each other, as for example, on different sides of the vehicle, in which case separate megaphones would naturally be made use of.

In equipping existing signaling instruments already installed on motor vehicles with my invention, nothing is needed except the substitution of a bulb and switch constructed in accordance with my invention, and of course, the necessary wiring for conducting the electric current.

Among the objects of the present invention are the arrangement of an electrical switch within the horn bulb and connections thereto in such manner that the electrical switch will not be operated by pressure applied to the side walls of the bulb, no matter how forcibly the bulb may be compressed, and which will not be closed to operate the louder electrical signaling instrument except when intentionally operated for that purpose, and which will provide a neat and convenient means of attachment of the electrical connections with no exposed wires in such position that they will be likely to be injured or to get in the way.

With the foregoing and related objects in view, my invention consists in the parts, improvements and combinations hereinafter set forth and claimed.

While I have illustrated a specific embodiment of my invention, it is to be understood that the same is for the purpose of illustration only, and that my invention is not limited thereto, but is as broad as my claims.

In the drawings forming part of this specification and wherein the same reference numerals are applied to designate the same parts throughout, Figure 1 is a view in central cross-section of a horn bulb equipped with a form of switch embodying my invention and Fig. 2 is a view showing an electrically operated signaling instrument and a reed horn, both devices making use of a single megaphone and the horn bulb being shown partly in section.

In the said drawings the reference numeral 1 is applied to the bulb of the penumatic signaling device, here shown as a reed horn, and 2 designates the tube for conveying the air to the vibrating reed which is shown in dotted lines at 3, and the continuation of the tube 2 is connected to the megaphone 4 of the electrically operated horn 5, which contains a diaphragm and electrically operated actuating means therefor not illustrated. This tube 2 may be connected to the megaphone in any desired manner, or if desired, a separate megaphone may be provided for the reed horn.

The reference numeral 6 is applied to the stationary switch member which is preferably placed within the tube 2 and is so constructed as not to interfere with the passage of air therethrough. This stationary switch member preferably consists of a foraminous metallic plug inserted within the metallic eduction tube 2, and is preferably formed from material such as wire netting and provided with an external flange 7, in order to give it bearing within the tube 2, and cupped at the center as shown at 8.

The movable switch member is indicated by the reference numeral 9 and preferably has the form of a metallic knob or button. The switch member 9 is borne by the free end of a flexible metallic member 10 which may be formed from coiled wire or the like and the flexible member 10 is secured to the horn bulb by means of any suitable fastening at the end thereof opposite the tube 2, the form of attachment shown consisting of the socket piece 11, to which the flexible member 10 is secured in any desired manner, as, for example, by being soldered thereto, and the socket piece 11 is provided with a stud 12 which is passed through an opening 13 provided in the horn bulb for that purpose and a washer or button 14 is secured thereon in any convenient manner, thus completing the fastening and closing the opening 13. A suitable insulating means such as a piece of rubber tubing 15 is made use of to cover the flexible member 10 where it projects within the tube 2, as so to prevent the passage of the electrical current except when the movable switch member 9 is brought into contact with the stationary switch member 6, which can be accomplished only by an endwise movement of the extreme end of the rubber bulb. A section of flexible wire 16 connects the socket piece 11 with the retaining ring 17 for holding the bulb in place on the tube 2, the wire being passed through or beneath the rubber of the bulb at the neck thereof. The wires 18 and 19 for carrying the current for operating the electrically actuated signaling device are connected to the stationary and movable switch members respectively, the wire 18 being connected to the metallic eduction tube 2 leading from the horn bulb, and the wire 19 being connected by the binding screw 20 to the retaining ring 17 and being connected with the movable switch member by means of the flexible wire 16 within the horn bulb.

The battery or other source of current is indicated by reference numeral 21.

The operation of my improved device will be readily understood from the foregoing. When it is desired to operate the pneumatic signaling device such as the reed horn the bulb 1 is compresed in the ordinary manner between the fingers and thumb of the operator. The effect of such compression is to increase the distance between the switch members rather than to decrease it, the tendency created by applying pressure to the sides of the bulb to cause it to become somewhat elongated. If the bulb is twisted or pushed to one side in sounding the pneumatic signaling device, the insulating means 15 will prevent the making of electrical contact between the movable switch member 9 or the flexible member 10 on which it is mounted with the horn tube 2, so that the switch will not be closed to permit the passage of electrical current to operate the electrical signaling device, unless pressure is applied on the end of the bulb for that purpose. Of course, very slight pressure directly upon the end of the bulb will operate to bring the switch member 9 into contact with the member 6 thus closing the switch and causing the operation of the electrical signaling device, the member 9 being guided into positive contact with the member 6 by means of the tube 2 into which the former preferably projects for a short distance.

Having now described my invention, I claim:

1. In combination, a compressible bulb, a metallic eduction tube therefor, a fixed switch member within said tube and a movable switch member within said bulb and secured thereto at the end opposite said tube and projecting within the said tube, substantially as set forth.

2. In combination, a hollow bulb, a metallic eduction tube therefor, a fixed switch member in said tube, a movable switch member within said bulb, a flexible connection between said switch member and said bulb, the point of connection being at the end opposite said tube, substantialy as set forth.

3. In combination, a signaling device operated by fluid pressure and comprising a compressible bulb, and an electrically operated signaling device, and a switch comprising two normally separated members both contained within the said bulb, the movable member being attached to the said bulb at the extreme end thereof opposite the tube, substantially as set forth.

4. In combination, a hollow bulb, a metallic eduction tube, a fixed switch member therein, a movable switch member, means for flexibly connecting said movable switch member to the end of said bulb opposite said tube, and an insulating sleeve upon said flexible connecting means, substantially as set forth.

5. In combination, a hollow bulb, a fixed switch member therein, and a movable switch member in said bulb and flexibly connected thereto, substantially as set forth.

6. In combination, a hollow bulb, a fixed switch member therein, a movable switch member therein, flexible means of connection between said movable switch member and the wall of the bulb, and insulating means surrounding said flexible connecting means, substantially as set forth.

7. In combination, a hollow bulb, a metallic eduction tube therefor, metallic means for retaining said bulb on said tube, a fixed switch member in electrical contact with said tube and a movable switch member in said bulb and in electrical contact with said retaining means, substantially as set forth.

8. In combination, a hollow bulb, a metallic eduction tube, a metallic ring for retaining said bulb upon said tube, a fixed switch member within said tube, a movable switch member connected to the wall of the said bulb, and an electrical conducting means between said retaining ring and said movable switch member, substantially as set forth.

9. In combination, a hollow bulb, a metallic eduction tube therefor, a fixed switch member within said eduction tube, a movable switch member attached to the inner wall of the bulb, insulating means for protecting the movable switch member from electrical contact with the interior of the eduction tube, metallic means for retaining said bulb upon said tube and flexible means of electrical connection between said retaining means and said movable switch, substantially as set forth.

10. In combination, a hollow bulb, a metallic eduction tube, a plug of wire gauze in said eduction tube serving as a switch member, and a movable switch member within said bulb and secured thereto at the end opposite said tube, substantially as set forth.

11. In combination, a hollow bulb, a metallic eduction tube, a fixed switch member therein, a movable switch member flexibly connected to said bulb at the end opposite said tube and provided with an insulating sleeve, means for retaining said bulb upon said tube, and means of electrical connection between said retaining means and said movable switch member and a source of electrical current, the poles whereof are connected respectively to said eduction tube and said retaining means, substantially as set forth.

12. In combination, a hollow bulb, an eduction tube, a fastening device penetrating said bulb at the end thereof opposite the eduction tube and firmly secured thereto, a coil of flexible wire secured to said fastening means, a movable switch member carried by said coil, the said coil and switch member projecting within the said tube, an insulating sleeve upon said coil and a fixed switch member within said tube and co-acting with said movable switch member, substantially as set forth.

In testimony whereof I have signed my name hereto in the presence of two subscribing witnesses this 29 day of November, 1912.

ALEXANDER N. PIERMAN.

Witnesses:
FRANK D. LEWIS,
CHRISTIAN E. BROWN.